(12) United States Patent
Jiao et al.

(10) Patent No.: US 10,176,619 B2
(45) Date of Patent: Jan. 8, 2019

(54) EMOTION AUGMENTED AVATAR ANIMATION

(71) Applicant: Intel Corporation, Santa Clara, CA (US)

(72) Inventors: Shaohui Jiao, Beijing (CN); Xiaolu Shen, Beijing (CN); Lidan Zhang, Beijing (CN); Qiang Li, Beijing (CN); Wenlong Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 15/102,200

(22) PCT Filed: Jul. 30, 2015

(86) PCT No.: PCT/CN2015/085556
§ 371 (c)(1),
(2) Date: Jun. 6, 2016

(87) PCT Pub. No.: WO2017/015949
PCT Pub. Date: Feb. 2, 2017

(65) Prior Publication Data
US 2017/0206694 A1 Jul. 20, 2017

(51) Int. Cl.
*G06T 13/40* (2011.01)
*G06T 7/246* (2017.01)
(Continued)

(52) U.S. Cl.
CPC .............. *G06T 13/40* (2013.01); *G06F 3/012* (2013.01); *G06K 9/00302* (2013.01);
(Continued)

(58) Field of Classification Search
None
See application file for complete search history.

(56) References Cited

U.S. PATENT DOCUMENTS

2011/0296324 A1* 12/2011 Goossens ............... G06Q 10/10
715/763
2011/0307837 A1* 12/2011 Cohen ................. G06F 3/04815
715/851

(Continued)

FOREIGN PATENT DOCUMENTS

CN 103593650 A 2/2014

OTHER PUBLICATIONS

International Search Report and Written Opinion dated May 4, 2016 for International Application No. PCT/CN2015/085556, 11 pages.

*Primary Examiner* — Vu Nguyen
(74) *Attorney, Agent, or Firm* — Schwabe, Wiulliamson & Wyatt, P.C.

(57) ABSTRACT

Apparatuses, methods and storage medium associated with emotion augmented animation of avatars are disclosed herein. In embodiments, an apparatus may comprise an animation augmentation engine to receive facial data of a user, analyze the facial data to determine an emotion state of the user, and drive additional animation that supplements animation of the avatar based at least in part on a result of the determination of the emotion state of the user. Other embodiments may be described and/or claimed.

24 Claims, 7 Drawing Sheets

(51) Int. Cl.
*G06F 3/01* (2006.01)
*G06K 9/00* (2006.01)

(52) U.S. Cl.
CPC ........ *G06T 7/246* (2017.01); *G06F 2203/011* (2013.01); *G06T 2207/20164* (2013.01); *G06T 2207/30201* (2013.01); *G06T 2207/30241* (2013.01); *G06T 2210/56* (2013.01)

(56) References Cited

U.S. PATENT DOCUMENTS

| | | | |
|---|---|---|---|
| 2013/0235045 A1* | 9/2013 | Corazza | G06T 13/40 345/473 |
| 2014/0153832 A1* | 6/2014 | Kwatra | G06T 11/00 382/195 |
| 2014/0154659 A1 | 6/2014 | Otwell | |
| 2014/0162612 A1 | 6/2014 | Ma | |
| 2014/0181229 A1 | 6/2014 | Tucker et al. | |
| 2015/0286858 A1* | 10/2015 | Shaburov | G06K 9/6209 382/103 |
| 2016/0364895 A1* | 12/2016 | Santossio | G06F 3/015 |

\* cited by examiner

EMOTION AUGMENTED AVATAR ANIMATION

CROSS REFERENCE TO RELATED APPLICATIONS

The present application is a national phase entry under 35 U.S.C. § 371 of International Application No. PCT/CN2015/085556, filed Jul. 30, 2015, entitled "EMOTION AUGMENTED AVATAR ANIMATION", which designated, among the various States, the United States of America. The Specification of the PCT/CN2015/085556 Application is hereby fully incorporated by reference.

TECHNICAL FIELD

The present disclosure relates to the field of data processing. More particularly, the present disclosure relates to generation and animation of avatars.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

As user's graphic representation, avatar has been quite popular in virtual world. However, most existing avatar systems are static, and few of them are driven by text, script or voice. Some other avatar systems use graphics interchange format (GIF) animation, which is a set of predefined static avatar image playing in sequence. In recent years, with the advancement of computer vision, camera, image processing, etc., some avatar may be driven by facial expressions. However, existing systems tend to be computation intensive, requiring high-performance general and graphics processor, and generally do not work well on mobile devices, such as smartphones or computing tablets. Further, while users may express their emotion in electronic communications or social networks, existing avatar systems do not provide such facilities.

BRIEF DESCRIPTION OF THE DRAWINGS

Embodiments for generation and animation of avatars will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
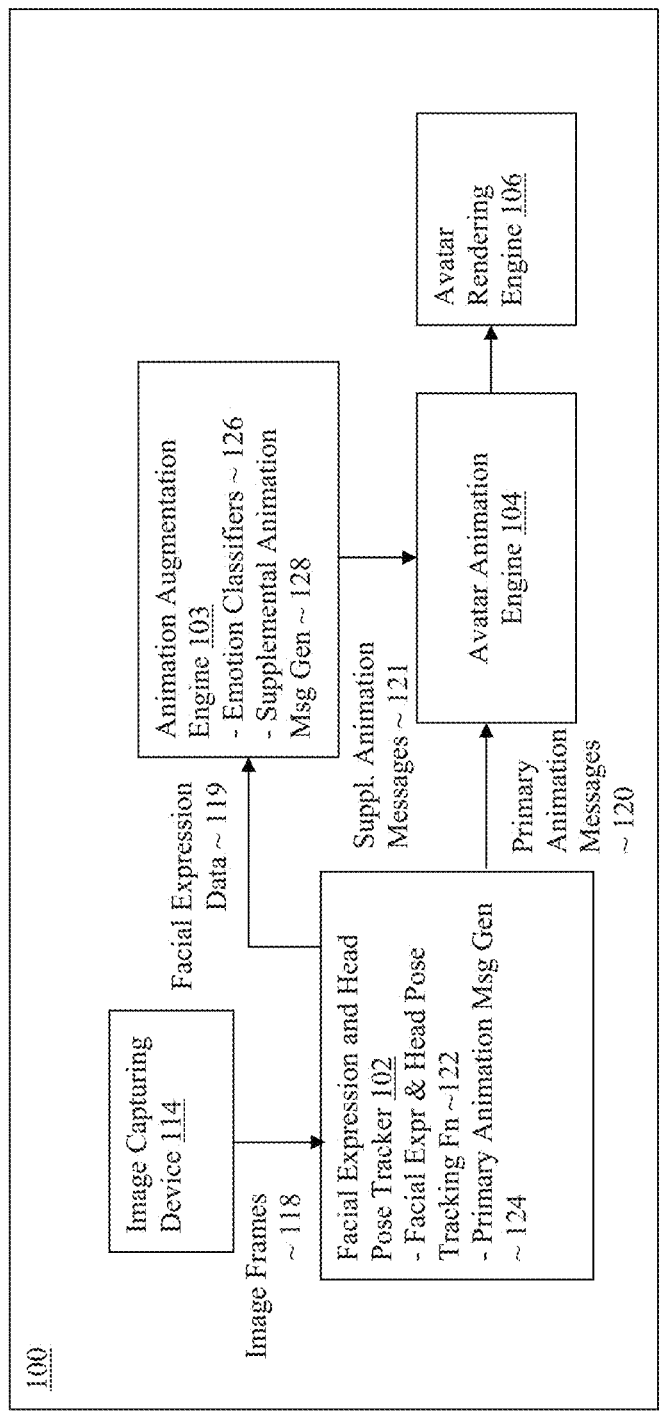
FIG. 1 illustrates a block diagram of an avatar system with emotion augmented animation, according to various embodiments.

Apparatuses, methods and storage medium associated with emotion augmented animation of avatars are disclosed herein. In embodiments, an apparatus may comprise an animation augmentation engine to receive facial data of a user, analyze the facial data to determine an emotion state of the user, and drive additional animation that supplements animation of the avatar based at least in part on a result of the determination of the emotion state of the user.

In embodiments, the apparatus may further comprise a facial expression tracker to receive one or more image frames of the user, analyze the one or more image frames to detect and track facial expressions of the user, and to provide the facial data to the animation augmentation engine based at least in part on a result of the analysis of the one or more image frames.

In embodiments, the apparatus may further comprise an avatar animation engine; wherein the facial expression tracker is to drive the avatar animation engine to animate the avatar based on facial expressions of the user detected and tracked; and wherein to drive additional animation, the animation augmentation engine is to drive the avatar animation engine to supplement the animation of the avatar based on facial expressions of the user detected and tracked with the additional animation.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an avatar system with emotion augmented avatar animation, according to the disclosed embodiments, is shown. As illustrated, in embodiments, avatar system 100 may include facial expression and head pose tracker 102, animation augmentation engine 103, avatar animation engine 104, and avatar rendering engine 106, coupled with each other, and configured to animate avatars based at least in part on facial expressions and/or head pose of a user, including augmenting the animation based on emotional states of the user.

In embodiments, facial expression and head pose tracker 102 may be configured to receive one or more image frames 118 of a user, from image capturing device 114, such as, a camera. Facial expression and head pose tracker 102 may analyze image frames 118 for facial expressions of the user, including head poses of the user. Still further, facial expression and head pose tracker 102 may be configured to output facial expression data 119 for animation augmentation engine 103, and a plurality of primary animation messages to drive primary animation of an avatar, based on the determined facial expressions and/or head poses of the user.

In embodiments, animation augmentation engine 103 may be configured to receive facial expression data 119, and analyze facial expression data 119 to determine emotional states of the user. Further, animation augmentation engine 103 may be configured to output a plurality of supplemental animation messages to augmented animation of an avatar, based on the determined emotional states of the user. In embodiments, the determined emotional states may include sub-states and/or intensity of the emotional states/sub-states.

Figure 2:
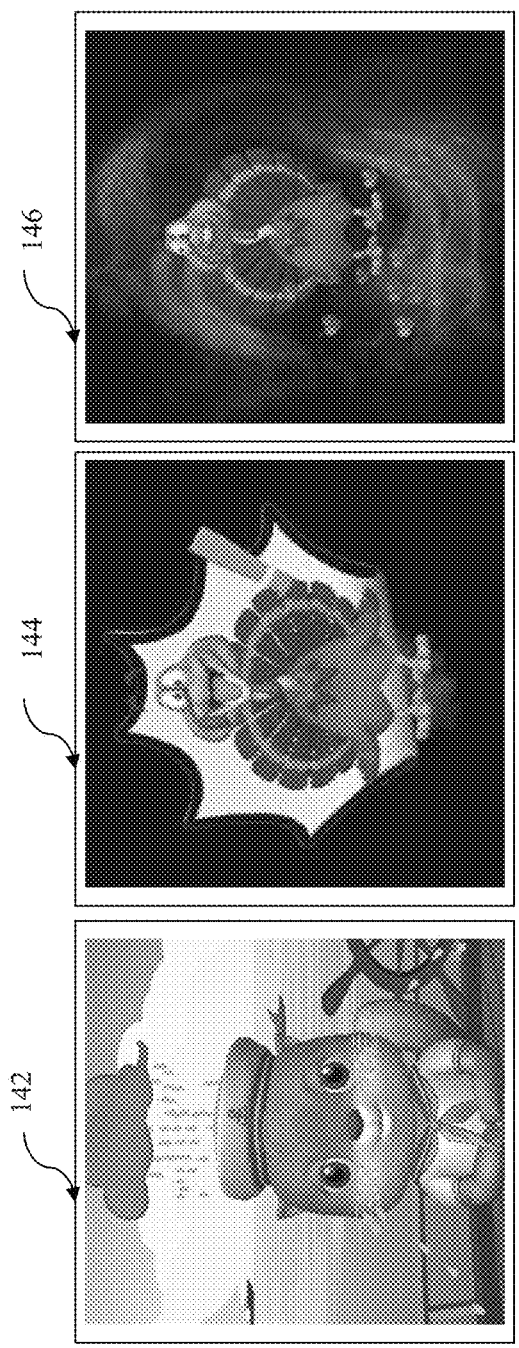
FIG. 2 illustrates examples of emotion augmented avatar animation, according to various embodiments.

Referring now also to FIG. 2, wherein a number of example emotion augmented animation of avatars, according to various embodiments, is shown. Snap shot 142 illustrates how an avatar animation may be augmented with tear drops, when the user is determined in e.g., a sad state. Snap shot 144 shows how an avatar animation may be augmented with an exclamation mark, when the user is determined to be in e.g., a surprise state. Snap shot 146 shows how an avatar animation may be augmented with a number of hearts, when the user is determined to be in e.g., a happy romantic state (as opposed to a generic happy state, where one or more of any number of happy faces may be rendered instead). In embodiments, the amount of augmentations, e.g., the volume and/or velocity of the tear drops in snap shot 142, the number of exclamation marks in snap shot 144, and the number and/or movement velocity of the hearts may vary with the determined intensity of the emotional state/sub-state.

Figure 3:
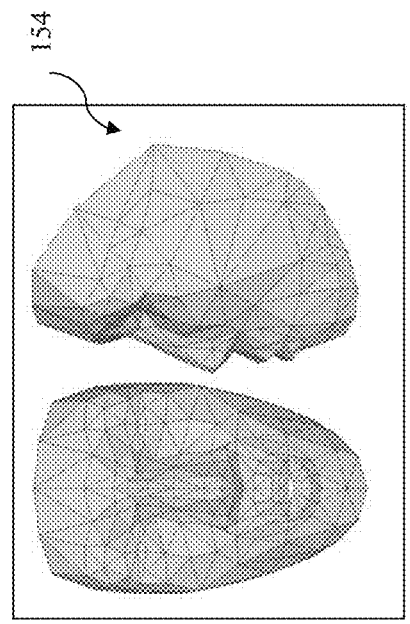
FIG. 3 illustrates examples facial meshes with landmarks suitable for determining emotional states; according to various embodiments.
Figure 3:
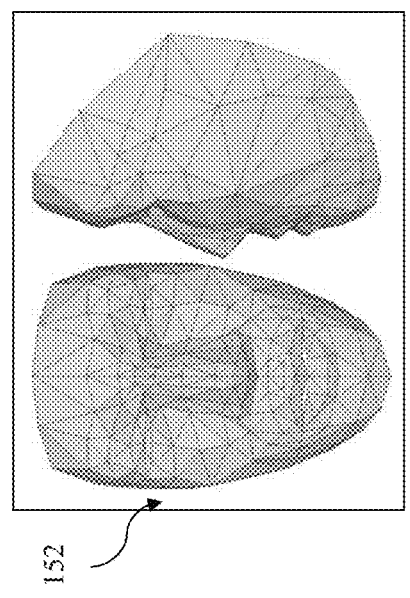

Referring now to FIG. 3, where example facial meshes with landmarks suitable for determining emotional states according to various embodiments, is illustrated. Facial mesh 152 illustrates a neutral non-emotional state, whereas facial mesh 154 illustrates a happy romantic state with the mouth protruded to convey kisses. In embodiments, each facial mesh 152/154 may include a number of pre-defined landmarks, 65 for the illustrated embodiments. Further, the facial expression depicted by each facial mesh 152/154 may be formed with a number of blend shapes, e.g., 18 (to be described more fully below). Facial expression data 119 may comprise data describing the facial mesh, including data describing the landmarks. Facial mesh 152/154 along with data describing the landmarks may e.g., be derived from image frames 118 by facial expression and head pose tracker 102.

Referring back to FIG. 1, in embodiments, for efficiency of operation, avatar system 100 may be configured to animate an avatar with a plurality of pre-defined blend shapes, making avatar system 100 particularly suitable for a wide range of mobile devices. A model with neutral expression and some typical expressions, such as mouth open, mouth smile, brow-up, and brow-down, blink, etc., may be first pre-constructed, in advance. The blend shapes may be decided or selected for various facial expression and head pose tracker 102 capabilities and target mobile device system requirements. During operation, facial expression and head pose tracker 102 may select various blend shapes, and assign the blend shape weights, based on the facial expression and/or head poses determined. The selected blend shapes and their assigned weights may be output as part of primary animation messages 120.

On receipt of the blend shape selection, and the blend shape weights ($\alpha_i$), avatar animation engine 104 may generate the expressed facial results with the following formula (Eq. 1):

$$B^* = B_0 + \sum_i \alpha_i \cdot \Delta B_i$$

where B* is the target expressed facial,
$B_0$ is the base model with neutral expression, and
$\Delta B_i$ is $i^{th}$ blend shape that stores the vertex position offset based on base model for specific expression.

More specifically, in embodiments, facial expression and head pose tracker 102 may be configured with facial expression tracking function 122 and primary animation message generation function 124. In embodiments, facial expression tracking function 122 may be configured to detect facial action movements of a face of a user and/or head pose gestures of a head of the user, within the plurality of image frames, and output a plurality of facial parameters that depict the determined facial expressions and/or head poses, in real time. For examples, the plurality of facial motion parameters may depict facial action movements detected, such as, eye and/or mouth movements, and/or head pose gesture parameters that depict head pose gestures detected, such as head rotation, movement, and/or coming closer or farther from the camera. Further, in embodiments, facial expression tracking function 122 may be configured to output facial data 119, such as data associated with various facial landmarks, e.g., in the context of a facial mesh.

In embodiments, facial action movements and head pose gestures may be detected, e.g., through inter-frame differences for a mouth and an eye on the face, and the head, based on pixel sampling of the image frames. Various ones of the function blocks may be configured to calculate rotation angles of the user's head, including pitch, yaw and/or roll, and translation distance along horizontal, vertical direction, and coming closer or going farther from the camera, eventually output as part of the head pose gesture parameters. The calculation may be based on a subset of sub-sampled pixels of the plurality of image frames, applying, e.g., dynamic template matching, re-registration, and so forth. These function blocks may be sufficiently accurate, yet scalable in their processing power required, making avatar system 100 particularly suitable to be hosted by a wide range of mobile computing devices, such as smartphones and/or computing tablets.

An example facial expression tracking function 122 will be further described later with references to FIG. 4.

In embodiments, primary animation message generation function 124 may be configured to selectively output primary animation messages 120 to drive animation of an avatar, based on the facial expression and head pose parameters depicting facial expressions and head poses of the user. In embodiments, primary animation message generation function 124 may be configured to convert facial action units into blend shapes and their assigned weights for animation of an avatar. Since face tracking may use different mesh geometry and animation structure with avatar rendering side, primary animation message generation function 124 may also be configured to perform animation coefficient conversion and face model retargeting. In embodiments, primary animation message generation function 124 may output the blend shapes and their weights as part of primary animation messages 120. Primary animation message 120 may specify a number of animations, such as "lower lip down" (LLIPD), "both lips widen" (BLIPW), "both lips up" (BLIPU), "nose wrinkle" (NOSEW), "eyebrow down" (BROWD), and so forth.

Still referring to FIG. 1, in embodiments, animation augmentation engine 103 may be configured with a number of emotion classifiers 126 and supplemental animation message generation function 128. In embodiments, emotion classifiers 126 may be pre-trained to analyze facial expression data 119, determine and classify the emotional states of a user, based on a result of the analysis. In embodiments, emotion classifiers 126 may be configured to employ any one of a number of discriminative classification techniques, e.g., support vector machines.

In embodiments, animation augmentation engine 103 may be configured with at least six pre-trained emotion classifiers 126, an angry state classifier, a disgusted state classifier, a fear state classifier, a happy state classifier, a sad state classifier, and a surprise state classifier. In embodiments, each classifier may be configured to analyze, determine and classify an emotional state based on facial data associated with facial landmarks in a facial mesh. For example, the classifiers may determine and classify an emotional state based on the position and shape of the eyebrows (e.g., whether it is raised), the position and shape of the mouth (e.g., whether it is open and how wide or whether it is protruded making a kiss), and so forth. In embodiments, as alluded to earlier, a classifier may determine emotional sub-states within an emotional state, e.g., whether the user is in a romantic state, within the happy state.

In embodiments, each classifier may also output an intensity value for each corresponding emotion state determined, e.g., a value between 0 to 7, with 0 being not intense, and 7 being very intense (e.g., 0 for a little bit of sadness, and 7 for very sad, when the emotional state is determined to be the sad state). In embodiments, each classifier may also output a confidence value for each corresponding emotion state (and intensity) determined, e.g., a value between 0 to 7, with 0 being not confident, and 7 being most confident.

In embodiments, supplemental animation message generation function 128 may be configured to selectively output supplemental animation messages 121 to augment animation of an avatar, based on the (most confident) determined emotional state (and intensity) of the user. In embodiments, supplemental animation message generation function 128 may be configured to provide the augmentations including, but are not limited to, tear drops, exclamation marks, happy faces, hearts, and so forth, for augmenting animation of an avatar. In embodiments, supplemental animation messages 121 may be similar in format and structure as primary animation messages 120.

Still referring to FIG. 1, avatar animation engine 104 may be configured to receive primary animation messages 120 outputted by facial expression and head pose tracker 102 and supplemental animation messages 121 outputted by animation augmentation engine 103, and drive an avatar model to animate the avatar, to replicate facial expressions and/or speech of the user on the avatar, with emotion based augmentations.

Avatar rendering engine 106 may be configured to draw the avatar, including the augmentations, as animated and supplemented by avatar animation engine 104. In embodiments, the drawing of the avatar being animated and the augmentation may be expedited through the graphics processors of the host computing system (hosting avatar system 100).

Facial expression and head pose tracker 102, animation augmentation engine 103, avatar animation engine 104 and avatar rendering engine 106, may each be implemented in hardware, e.g., Application Specific Integrated Circuit (ASIC) or programmable devices, such as Field Programmable Gate Arrays (FPGA) programmed with the appropriate logic, software to be executed by general and/or graphics processors, or a combination of both.

Compared with other facial animation techniques, such as motion transferring and mesh deformation, using blend shape for facial animation may have several advantages: 1) Expressions customization: expressions may be customized according to the concept and characteristics of the avatar, when the avatar models are created. The avatar models may be made more funny and attractive to users. 2) Low computation cost: the computation may be configured to be proportional to the model size, and made more suitable for parallel processing. 3) Good scalability: addition of more expressions into the framework may be made easier.

It will be apparent to those skilled in the art that these features, individually and in combination, make avatar system 100 particularly suitable to be hosted by a wide range of mobile computing devices. However, while avatar system 100 is designed to be particularly suitable to be operated on a mobile device, such as a smartphone, a phablet, a computing tablet, a laptop computer, or an e-reader, the disclosure is not to be so limited. It is anticipated that avatar system 100 may also be operated on computing devices with more computing power than the typical mobile devices, such as a desktop computer, a game console, a set-top box, or a computer server. The foregoing and other aspects of pocket avatar system 100 will be described in further detail in turn below.

Figure 4:
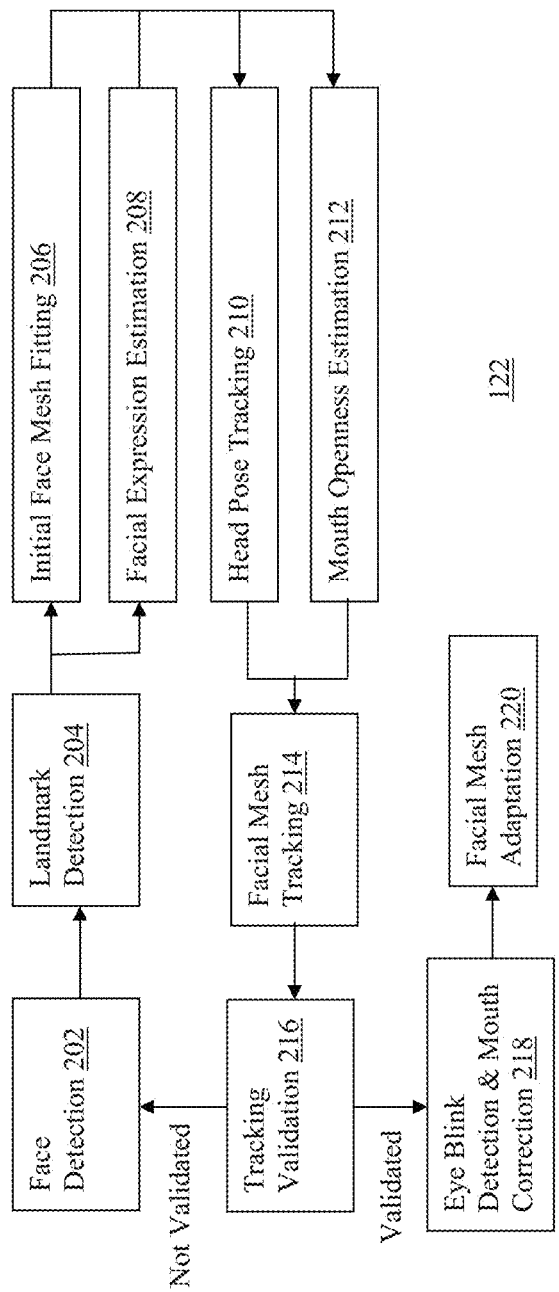
FIG. 4 illustrates the facial expression tracking function of FIG. 1 in further detail, according to various embodiments.

Referring now to FIG. 4, wherein an example implementation of the facial expression tracking function 122 of FIG. 1 is illustrated in further detail, according to various embodiments. As shown, in embodiments, facial expression tracking function 122 may include face detection function block 202, landmark detection function block 204, initial face mesh fitting function block 206, facial expression estimation function block 208, head pose tracking function block 210, mouth openness estimation function block 212, facial mesh tracking function block 214, tracking validation function block 216, eye blink detection and mouth correction function block 218, and facial mesh adaptation block 220 coupled with each other as shown.

In embodiments, face detection function block 202 may be configured to detect the face through window scan of one or more of the plurality of image frames received. At each window position, modified census transform (MCT) features may be extracted, and a cascade classifier may be applied to look for the face. Landmark detection function block 204 may be configured to detect landmark points on the face, e.g., eye centers, nose-tip, mouth corners, and face contour points. Given a face rectangle, an initial landmark position may be given according to mean face shape. Thereafter, the exact landmark positions may be found iteratively through an explicit shape regression (ESR) method.

In embodiments, initial face mesh fitting function block 206 may be configured to initialize a 3D pose of a face mesh based at least in part on a plurality of landmark points detected on the face. A Candide3 wireframe head model may be used. The rotation angles, translation vector and scaling factor of the head model may be estimated using the POSIT algorithm. Resultantly, the projection of the 3D mesh on the image plane may match with the 2D landmarks. Facial expression estimation function block 208 may be configured to initialize a plurality of facial motion parameters based at least in part on a plurality of landmark points detected on the face. The Candide3 head model may be controlled by facial action parameters (FAU), such as mouth width, mouth height, nose wrinkle, eye opening. These FAU parameters may be estimated through least square fitting.

Head pose tracking function block 210 may be configured to calculate rotation angles of the user's head, including pitch, yaw and/or roll, and translation distance along horizontal, vertical direction, and coming closer or going farther from the camera. The calculation may be based on a subset of sub-sampled pixels of the plurality of image frames, applying dynamic template matching and re-registration. Mouth openness estimation function block 212 may be configured to calculate opening distance of an upper lip and a lower lip of the mouth. The correlation of mouth geometry (opening/closing) and appearance may be trained using a sample database. Further, the mouth opening distance may be estimated based on a subset of sub-sampled pixels of a current image frame of the plurality of image flames, applying FERN regression.

Facial mesh tracking function block 214 may be configured to adjust position, orientation or deformation of a face mesh to maintain continuing coverage of the face and reflection of facial movement by the face mesh, based on a subset of sub-sampled pixels of the plurality of image frames. The adjustment may be performed through image alignment of successive image frames, subject to pre-defined FAU parameters in Candide3 model. The results of head pose tracking function block 210 and mouth openness may serve as soft-constraints to parameter optimization. Tracking validation function block 216 may be configured to monitor face mesh tracking status, to determine whether it is necessary to re-locate the face. Tracking validation function block 216 may apply one or more face region or eye region classifiers to make the determination. If the tracking is running smoothly, operation may continue with next frame tracking, otherwise, operation may return to face detection function block 202, to have the face re-located for the current frame.

Eye blink detection and mouth correction function block 218 may be configured to detect eye blinking status and mouth shape. Eye blinking may be detected through optical flow analysis, whereas mouth shape/movement may be estimated through detection of inter-frame histogram differences for the mouth. As refinement of whole face mesh tracking, eye blink detection and mouth correction function block 216 may yield more accurate eye-blinking estimation, and enhance mouth movement sensitivity.

Face mesh adaptation function block 220 may be configured to reconstruct a face mesh according to derived facial action units, and re-sample of a current image frame under the face mesh to set up processing of a next image frame.

Example facial expression tracking function 122 is the subject of co-pending patent application, PCT Patent Application No. PCT/CN2014/073695, entitled "FACIAL EXPRESSION AND/OR INTERACTION DRIVEN AVATAR APPARATUS AND METHOD," filed Mar. 19, 2014. As described, the architecture, distribution of workloads among the functional blocks render facial expression tracking function 122 particularly suitable for a portable device with relatively more limited computing resources, as compared to a laptop or a desktop computer, or a server. For further details, refer to PCT Patent Application No. PCT/CN2014/073695.

In alternate embodiments, facial expression tracking function 122 may be any one of a number of other face trackers known in the art.

Figure 5:
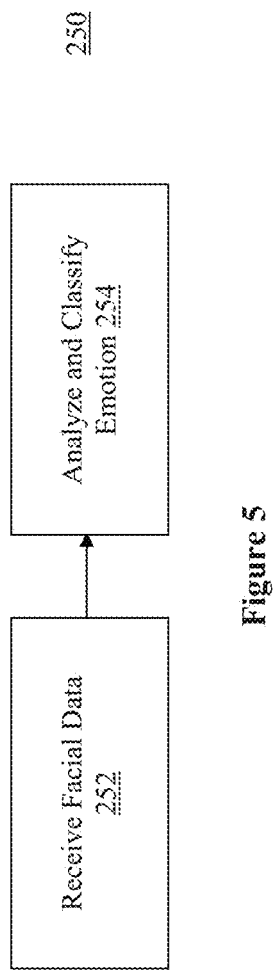
FIG. 5 illustrates aspects of the operational flow of the animation augmentation engine of FIG. 1, according to various embodiments.

Referring now to FIG. 5, wherein aspects of the operational flow of the animation augmentation engine of FIG. 1, according to various embodiments, are illustrated. More specifically, aspects of the operation flow of emotion classifiers 126 of FIG. 1, depicted as process 250, are illustrated. As shown, process 250 for determining and classifying emotional states of a user may comprise operations at blocks 252 and 254. At block 252, facial data, e.g., facial data associated with facial landmarks of a facial mesh, may be received. At block 254, each classifier may process and analyze the facial data, and classify the emotion state accordingly. As alluded/described earlier, in embodiments, operations at 254 may be performed by a plurality of classifiers, e.g., six, in parallel. The classifiers may include an angry state classifier, a disgusted state classifier, a fear state classifier, a happy state classifier, a sad state classifier, and a surprise state classifier. In alternate embodiments, more or less classifiers may be employed. Further, as alluded/described earlier, in embodiments, the classified emotional state at block 254 may include a sub-state designation, an emotional intensity value, and/or a confidence value of the classification.

Figure 6:
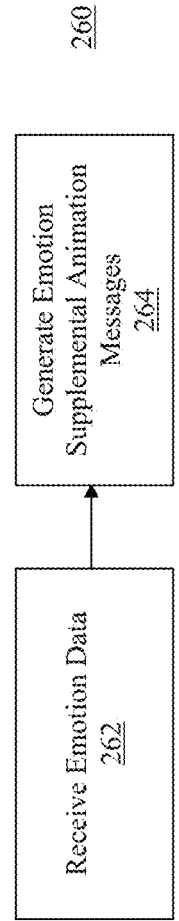
FIG. 6 illustrates further aspects of the operational flow of the animation augmentation engine of FIG. 1, according to various embodiments.

Referring now to FIG. 6, wherein aspects of the operational flow of the animation augmentation engine of FIG. 1, according to various embodiments, are illustrated. More specifically, aspects of the operation flow of supplemental animation message generator 128 of FIG. 1, depicted as process 260, are illustrated. As shown, process 260 may comprise operations at blocks 262 and 264. At block 262, emotion data, e.g., an emotion state/sub-state, an intensity value and/or a confidence value, may be received. At block 264, supplemental animation message may be generated, based at least in part on e.g., the most confident emotional state and intensity determined. As described earlier, the supplemental animation messages may be similar to the earlier described primary animation messages, except they describe the augmentations to be provided. As alluded/ described earlier, these augmentations may include, but are not limited to, e.g., tear drops for the sad state, exclamation marks for the surprise state, happy faces for the happy state, hearts for the happy romantic state, fires for the angry state, teeth making the sound "grrr" or flies flying around for the disgusted state, ghosts or exploding bombs for the fear state, and so forth. Further, the amount, e.g., volume and/or velocity, of the augmentations may vary in accordance with the determined intensity of the emotion.

Referring back to FIG. 2, as described earlier, snap shot 142 illustrates an example emotion based augmentation where tear drops may be added to augment animation of an avatar, when the user was determined to be in a sad state. As illustrated, tear drops are rendered as flowing from the avatar's eye. Computationally, in embodiments, emitters may be created at the eye locations to emit the tear drops. The tear drops may correspond to particles emitted from the emitters. The direction of travel of the particles (such as, flow of the tear drops) may follow a trajectory selected from a plurality of pre-defined trajectories. The volume and velocity of the particles (e.g., the tear drops) may be based on the intensity of the determined emotion.

Figure 7:
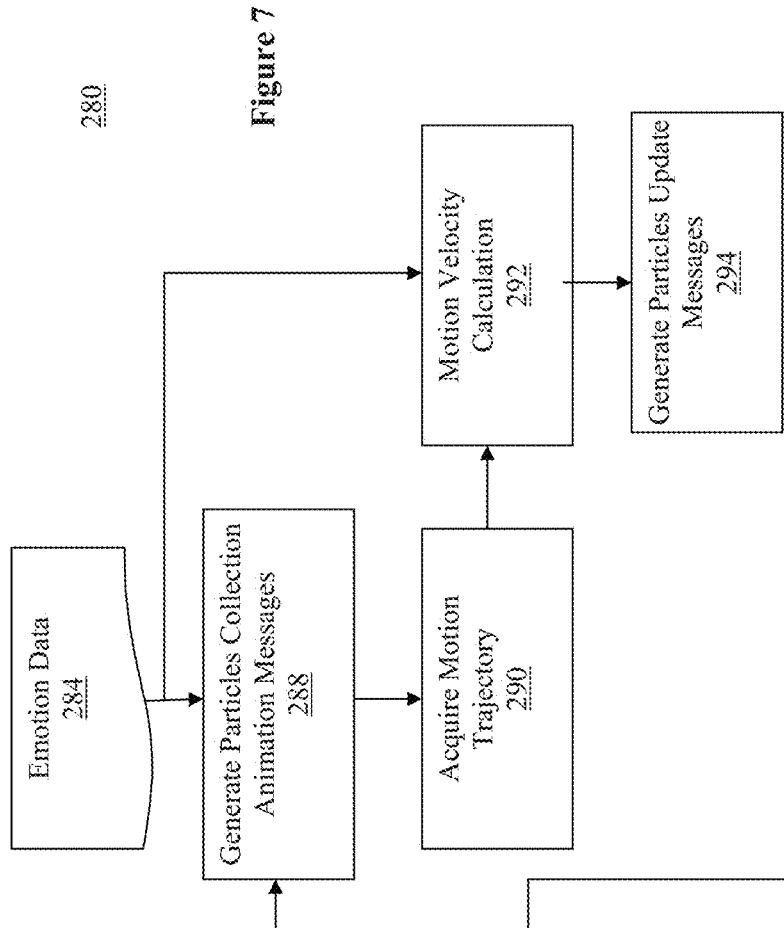
FIG. 7 illustrates aspects of an example process for emotion augmented animation of an avatar, according to various embodiments.

Referring to FIG. 7, wherein aspects of an example process for emotion augmented animation of an avatar, according to various embodiments, is shown. As illustrated, process 280 for emotion based augmentation of animation of an avatar that involved creation of emitters and computation of the emitted particles travel direction and velocity, may comprise operations at blocks 286-294. The operations may be performed e.g., by earlier described animation augmentation engine 103 of FIG. 1 (more specifically, supplemental animation message generator 128).

As shown, process 280 may start at block 286. At block 286, data associated with facial landmarks 282, e.g., landmarks associated with a facial mesh, may be used to generate and create the emitters for a selected augmentation. For example, the tear emitter may be set at the tracked eye landmarks.

At block 288, an initial set of particle animation messages may be generated, providing initial descriptions of the augmentations to be provided.

At block 290, a motion trajectory may be acquired/selected for the particles to be emitted from the emitters, e.g., as described earlier, from a pre-defined set of trajectories.

At block 292, the direction and velocity of the particles may be calculated.

At block 294, the particle animation messages may be updated to reflect the computed direction and velocity of the particles.

Figure 8:
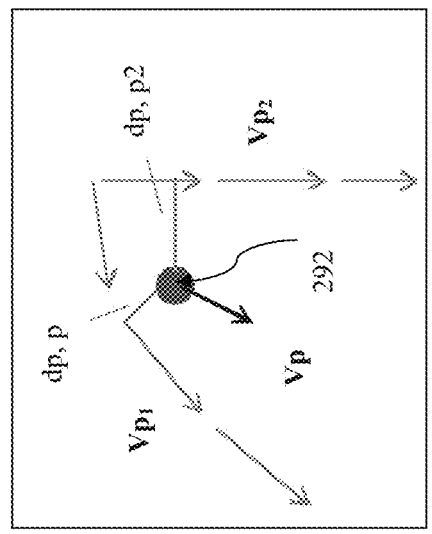
FIG. 8 illustrates an example particle trajectory, according to various embodiments.

Referring now to FIG. 8, wherein an example trajectory for a particle, according to various embodiments, is shown. The center particle 292 represents a current position of a particle (e.g., a tear drop). $V_p$ represents the composite travel vector of the particle, that is, the direction of vector $V_p$ provides for the composite travel direction of the particle, whereas the magnitude of vector $V_p$ provides for the travel velocity of the particle. The composite vector $V_p$ may be the weighted sum of the constituent forces that influence the direction and velocity of particle 292. Examples of the constituent forces may include, but are not limited to, external forces, such as, gravity with direction and magnitude, and internal forces, such as shearing force. Other examples of constituent forces may include impulsive forces, such as emitting force for particles, including both direction and velocity.

In FIG. 8, two influencing forces are illustrated, with vectors $V_{p1}$ and $V_{p2}$ respectively representing the directions and magnitudes of constituent forces 1 and 2. The quantities $d_{p,p1}$ and $d_{p,p2}$ respectively represent the relative weights of constituent forces 1 and 2. For ease of understanding, two constituent forces are illustrated in FIG. 8. However, in embodiments, more than 2 constituent forces may be considered.

Thus, in general vector $V_p$ may be computed as follows (eq. 2):

$$V_P = \sum_{P_m} \frac{1}{d_{P,P_m}} V_{P_m}$$

where $P_m$ may be $P_1, P_2, P_3, P_4$ . . . and so forth;
$V_p$, $V_{pm}$, $d_{p,p1}$ and $d_{p,p2}$ are as defined earlier.

Figure 9:
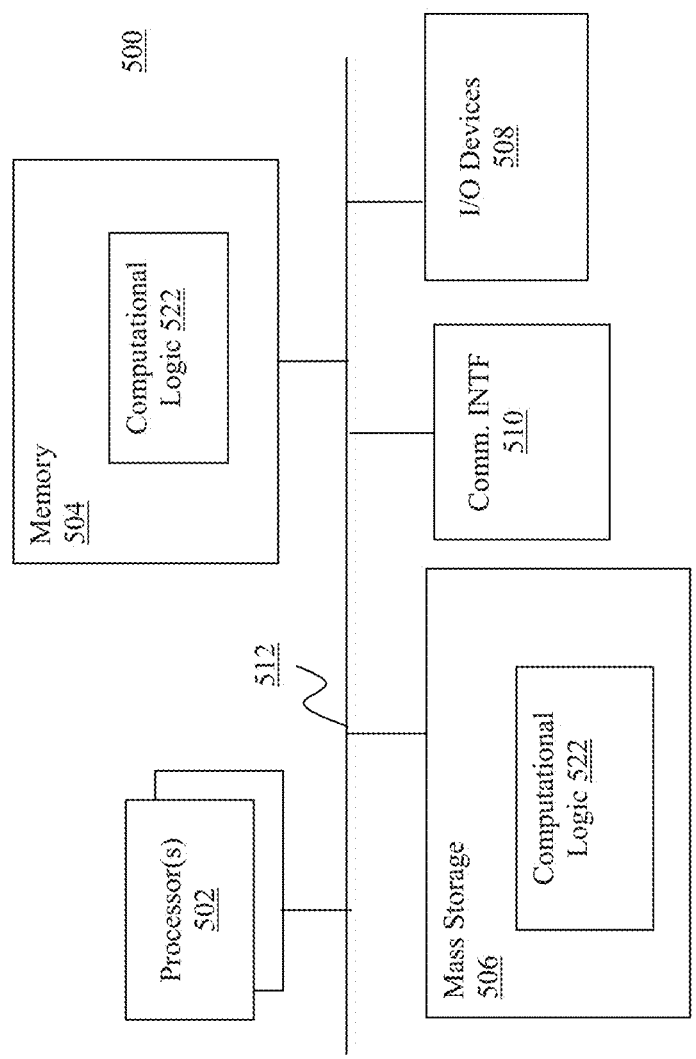
FIG. 9 illustrates an example computer system suitable for use to practice various aspects of the present disclosure, according to the disclosed embodiments.

FIG. 9 illustrates an example computer system that may be suitable for use as a client device or a server to practice selected aspects of the present disclosure. As shown, computer 500 may include one or more processors or processor cores 502, and system memory 504. For the purpose of this application, including the claims, the term "processor" refers to physical processors, and the terms "processor" and "processor cores" may be considered synonymous, unless the context clearly requires otherwise. Additionally, computer 500 may include mass storage devices 506 (such as diskette, hard drive, compact disc read only memory (CD-ROM) and so forth), input/output devices 508 (such as display, keyboard, cursor control and so forth) and communication interfaces 510 (such as network interface cards, modems and so forth). The elements may be coupled to each other via system bus 512, which may represent one or more buses. In the case of multiple buses, they may be bridged by one or more bus bridges (not shown).

Each of these elements may perform its conventional functions known in the art. In particular, system memory 504 and mass storage devices 506 may be employed to store a working copy and a permanent copy of the programming instructions implementing the operations associated with facial expression and head pose tracker 102, animation augmentation engine 103, avatar animation engine 104, and/or avatar rendering engine 106, earlier described, and collectively referred to as computational logic 522. The various elements may be implemented by assembler instructions supported by processor(s) 502 or high-level languages, such as, for example, C, that can be compiled into such instructions.

The number, capability and/or capacity of these elements 510-512 may vary, depending on whether computer 500 is used as a client device or a server. When use as client device, the capability and/or capacity of these elements 510-512 may vary, depending on whether the client device is a stationary or mobile device, like a smartphone, computing tablet, ultrabook or laptop. Otherwise, the constitutions of elements 510-512 are known, and accordingly will not be further described.

Figure 10:
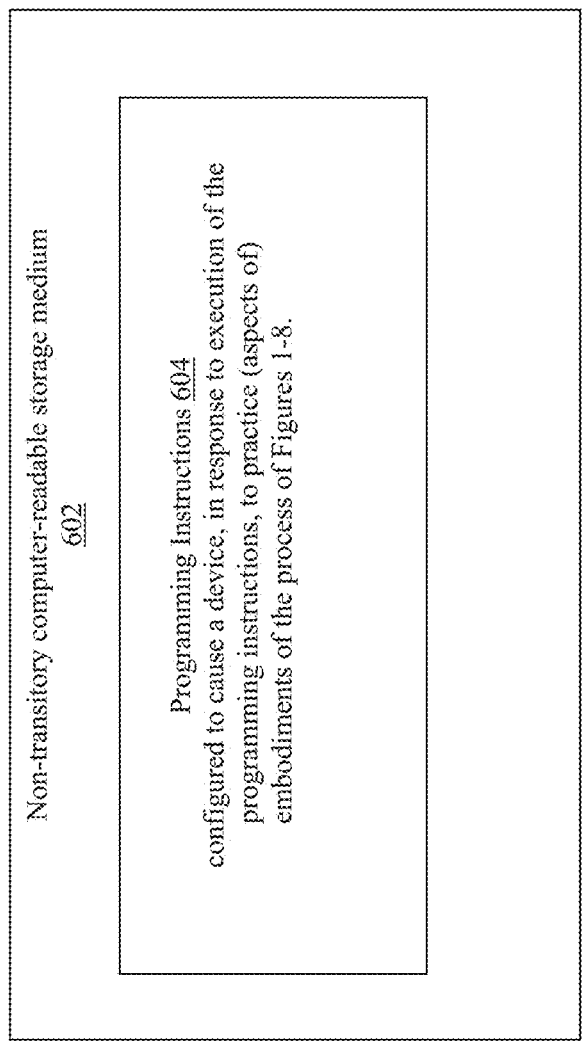
FIG. 10 illustrates a storage medium having instructions for practicing methods described with references to FIGS. 1-8, according to disclosed embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 10 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to perform, e.g., various operations associated with facial expression and head pose tracker 102, animation augmentation engine 103, avatar animation engine 104, and/or avatar rendering engine 106. In alternate embodiments, programming instructions 604 may be disposed on multiple computer-readable non-transitory storage media 602 instead. In alternate embodiments, programming instructions 604 may be disposed on computer-readable transitory storage media 602, such as, signals.

Any combination of one or more computer usable or computer readable media may be utilized. The computer-usable or computer-readable medium/media may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium/media could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 9, for one embodiment, at least one of processors 502 may be packaged together with memory having computational logic 522 (in lieu of storing on memory 504 and storage 506). For one embodiment, at least one of processors 502 may be packaged together with memory having computational logic 522 to form a System in Package (SiP). For one embodiment, at least one of processors 502 may be integrated on the same die with memory having computational logic 522. For one embodiment, at least one of processors 502 may be packaged together with memory having computational logic 522 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may be an apparatus for animating an avatar, comprising: one or more processors; and an animation augmentation engine to be operated by the processor to receive facial data of a user, analyze the facial data to determine an emotion state of the user, and drive additional animation that supplements animation of the avatar based at least in part on a result of the determination of the emotion state of the user.

Example 2 may be example 1, wherein to receive facial data, the animation augmentation engine may receive facial landmark data of a facial mesh of the user.

Example 3 may be example 1, wherein to analyze the facial data, the animation augmentation engine may comprise a plurality of emotion classifiers to respectively process the facial data, and generate a plurality of confidence values for corresponding emotion states of the emotion classifiers.

Example 4 may be example 3, wherein the plurality of emotion classifiers may comprise at least one of an angry state classifier, a disgusted state classifier, a fear state classifier, a happy state classifier, a sad state classifier, or a surprise state classifier.

Example 5 may be example 1, wherein to drive additional animation, the animation augmentation engine may create an emitter for the additional animation, and generate a collection of particles to be emitted from the emitter.

Example 6 may be example 5, wherein the animation augmentation engine may further acquire a movement trajectory, and calculate velocity in the movement trajectory for the particles to be emitted from the emitter.

Example 7 may be any one of examples 1-6, further comprising a facial expression tracker to be operated by the one or more processors to receive one or more image frames of the user, analyze the one or more image frames to detect and track facial expressions of the user, and to provide the facial data to the animation augmentation engine based at least in part on a result of the analysis of the one or more image frames.

Example 8 may be example 7 further comprising an avatar animation engine to be operated by the one or more processors; wherein the facial expression tracker may drive the avatar animation engine to animate the avatar based on facial expressions of the user detected and tracked; and wherein to drive additional animation, the animation augmentation engine may drive the avatar animation engine to supplement the animation of the avatar based on facial expressions of the user detected and tracked, with the emotion state based additional animation.

Example 9 may be example 8, wherein the facial expression tracker may comprise a primary animation message generator to generate primary animation messages based on facial expressions of the user detected and tracked, and send the primary animation messages to the avatar animation engine to drive the avatar animation engine to animate the avatar based on facial expressions of the user; and the animation augmentation engine may comprise a supplemental animation message generator to generate supplemental animation messages based on the emotion state of the user detected, and send the supplemental animation messages to the avatar animation engine to drive the avatar animation engine to supplement the animation of the avatar based on facial expressions of the user, with the emotion state based additional animation.

Example 10 may be example 7, wherein the apparatus may be a selected one of a smartphone, a computing tablet, an ultrabook, an ebook, or a laptop computer.

Example 11 may be a method for animating an avatar, comprising: receiving, by a computing device, facial data of a user; analyzing, by the computing device, the facial data to determine an emotion state of the user; and driving, by the computing device, additional animation that supplements animation of the avatar based at least in part on a result of the determination of the emotion state of the user.

Example 12 may be example 11, wherein receiving may comprise receiving facial landmark data of a facial mesh of the user.

Example 13 may be example 11, wherein analyzing may comprise respectively processing the facial data with a plurality of emotion classifiers to generate a plurality of confidence values for corresponding emotion states of the emotion classifiers.

Example 14 may be example 13, wherein the emotion states comprise at least one of an angry state, a disgusted state, a fear state, a happy state, a sad state, or a surprise state.

Example 15 may be example 11, wherein driving additional animation may comprise creating an emitter for the additional animation, and generating a collection of particles to be emitted from the emitter.

Example 16 may be example 15, wherein driving additional animation may further comprise acquiring a movement trajectory, and calculating velocity in the movement trajectory for the particles to be emitted from the emitter.

Example 17 may be any one of examples 11-16, further comprising receiving one or more image frames of the user, analyzing the one or more image frames to detect and track facial expressions of the user, and providing the facial data based at least in part on a result of the analysis of the one or more image frames.

Example 18 may be example 17 further comprising driving animation of the avatar based on facial expressions of the user detected and tracked; and wherein driving additional animation may comprise supplementing the animation of the avatar based on facial expressions of the user detected and tracked, with the emotion state based additional animation.

Example 19 may be example 18, wherein driving animation may comprise generating primary animation messages based on facial expressions of the user detected and tracked, and sending the primary animation messages to drive animation of the avatar based on facial expressions of the user; and driving additional animation may comprise generating supplemental animation messages based on the emotion state of the user detected, and sending the supplemental animation messages to drive animation of avatar to supplement the animation of the avatar based on facial expressions of the user, with the emotion state based additional animation.

One or more computer-readable media comprising instructions that cause an computing device, in response to execution of the instructions by the computing device, to operate an animation augmentation engine to: receive facial data of a user, analyze the facial data to determine an emotion state of the user, and drive additional animation that supplements animation of the avatar based at least in part on a result of the determination of the emotion state of the user.

Example 21 may be example 20, wherein to receive facial data may comprise to receive facial landmark data of a facial mesh of the user.

Example 22 may be example 20, wherein to analyze the facial data may comprise to respectively process the facial data with a plurality of emotion classifiers to generate a plurality of confidence values for corresponding emotion states of the emotion classifiers.

Example 23 may be example 22, wherein the plurality of emotion classifiers comprise at least one of an angry state classifier, a disgusted state classifier, a fear state classifier, a happy state classifier, a sad state classifier, or a surprise state classifier.

Example 24 may be example 20, wherein to drive additional animation may comprise to create an emitter for the additional animation, and generate a collection of particles to be emitted from the emitter.

Example 25 may be example 24, wherein to drive additional animation may further comprise to further acquire a movement trajectory, and calculate velocity in the movement trajectory for the particles to be emitted from the emitter.

Example 26 may be any one of examples 20-25, wherein the computing device is further caused to receive one or more image frames of the user, analyze the one or more image frames to detect and track facial expressions of the user, and to provide the facial data based at least in part on a result of the analysis of the one or more image frames.

Example 27 may be example 26, wherein the computing device is further caused to drive the avatar animation engine to animate the avatar based on facial expressions of the user detected and tracked; and wherein to drive additional animation may comprise to supplement the animation of the avatar based on facial expressions of the user detected and tracked, with the emotion state based additional animation.

Example 28 may be example 27, wherein to drive animation may comprise to generate primary animation messages based on facial expressions of the user detected and tracked, and send the primary animation messages to the avatar animation engine to drive the avatar animation engine to animate the avatar based on facial expressions of the user; and to drive additional animation may comprise to generate supplemental animation messages based on the emotion state of the user detected, and send the supplemental animation messages to the avatar animation engine to drive the avatar animation engine to supplement the animation of the avatar based on facial expressions of the user, with the emotion state based additional animation.

Example 29 may be an apparatus for generating or animating an avatar, comprising: means for receiving facial data of a user; means for analyzing the facial data to determine an emotion state of the user; and means for driving additional animation that supplements animation of the avatar based at least in part on a result of the determination of the emotion state of the user.

Example 30 may be example 29, wherein means for receiving may comprise means for receiving facial landmark data of a facial mesh of the user.

Example 31 may be example 29, wherein means for analyzing may comprise means for respectively processing the facial data to generate a plurality of confidence values for corresponding emotion states of the emotion classifiers.

Example 32 may be example 31, wherein the emotion states comprise at least one of an angry state, a disgusted state, a fear state, a happy state, a sad state, or a surprise state.

Example 33 may be example 29, wherein means for driving additional animation may comprise means for creating an emitter for the additional animation, and means for generating a collection of particles to be emitted from the emitter.

Example 34 may be example 33, wherein means for driving additional animation may further comprise means for acquiring a movement trajectory, and means for calculating velocity in the movement trajectory for the particles to be emitted from the emitter.

Example 35 may be any one of examples 29-34, further comprising means for receiving one or more image frames of the user, means for analyzing the one or more image frames to detect and track facial expressions of the user, and means for providing the facial data based at least in part on a result of the analysis of the one or more image frames.

Example 36 may be example 35 further comprising means for driving animation of the avatar based on facial expressions of the user detected and tracked; and wherein means for driving additional animation may comprise means for supplementing the animation of the avatar based on facial expressions of the user detected and tracked, with the emotion state based additional animation.

Example 37 may be example 36, wherein means for driving animation may comprise means for generating primary animation messages based on facial expressions of the user detected and tracked, and means for sending the primary animation messages to drive animation of the avatar based on facial expressions of the user; and means for driving additional animation may comprise means for generating supplemental animation messages based on the emotion state of the user detected, and means for sending the supplemental animation messages to drive animation of avatar to supplement the animation of the avatar based on facial expressions of the user, with the emotion state based additional animation.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claim and its equivalents.

What is claimed is:

1. An apparatus for animating an avatar, comprising:
one or more processors; and
an animation augmentation engine to be operated by the processor to receive facial expression data of a user, analyze the facial expression data to determine an emotion state of the user, the emotion state being one of a plurality of emotion states including at least one of a disgusted state, a fear state, or a surprise state, and drive additional animation that supplements animation of the avatar based at least in part on a result of the determination of the emotion state of the user, the additional animation and the animation of the avatar being separate animations;
wherein the animation augmentation engine is to further determine an intensity of the determined emotion state, acquire a movement trajectory, and calculate velocity in the movement trajectory for a collection of particles to be emitted from an emitter based at least in part on the determined intensity of the determined emotion state.

2. The apparatus of claim 1, wherein to receive facial expression data, the animation augmentation engine is to receive facial landmark data of a facial mesh of the user.

3. The apparatus of claim 1, wherein to analyze the facial expression data, the animation augmentation engine comprises a plurality of emotion classifiers to respectively process the facial expression data, and generate a plurality of confidence values for corresponding emotion states of the emotion classifiers.

4. The apparatus of claim 3, wherein the plurality of emotion classifiers comprise at least one of a disgusted state classifier, a fear state classifier, or a surprise state classifier.

5. The apparatus of claim 1, wherein to drive additional animation, the animation augmentation engine is to create the emitter for the additional animation, and generate the collection of particles to be emitted from the emitter.

6. The apparatus of claim 1, further comprising a facial expression tracker to be operated by the one or more processors to receive one or more image frames of the user, analyze the one or more image frames to detect and track facial expressions of the user, and to provide the facial expression data to the animation augmentation engine based at least in part on a result of the analysis of the one or more image frames.

7. The apparatus of claim 6, further comprising an avatar animation engine to be operated by the one or more processors; wherein the facial expression tracker is to drive the avatar animation engine to animate the avatar based on facial expressions of the user detected and tracked; and wherein to drive additional animation, the animation augmentation engine is to drive the avatar animation engine to separately supplement the animation of the avatar based on facial expressions of the user detected and tracked, with the emotion state based additional animation.

8. The apparatus of claim 7, wherein the facial expression tracker comprises a primary animation message generator to generate primary animation messages based on facial expressions of the user detected and tracked, and send the primary animation messages to the avatar animation engine to drive the avatar animation engine to animate the avatar based on facial expressions of the user; and the animation augmentation engine comprises a supplemental animation message generator to generate supplemental animation messages based on the emotion state of the user detected, and send the supplemental animation messages to the avatar animation engine to drive the avatar animation engine to separately supplement the animation of the avatar based on facial expressions of the user, with the emotion state based additional animation.

9. The apparatus of claim 6, wherein the apparatus is a selected one of a smartphone, a computing tablet, an ultrabook, an ebook, or a laptop computer.

10. A method for animating an avatar, comprising:
receiving, by a computing device, facial expression data of a user;
analyzing, by the computing device, the facial expression data to determine an emotion state of the user, the emotion state being one of a plurality of emotion states including at least one of a disgusted state, a fear state, or a surprise state;
driving, by the computing device, additional animation that supplements animation of the avatar based at least in part on a result of the determination of the emotion state of the user, the additional animation and the animation of the avatar being separate animations;
determining, by the computing device, an intensity of the determined emotion state;
acquiring, by the computing device, a movement trajectory; and
calculating, by the computing device, velocity in the movement trajectory for a collection of particles to be emitted from an emitter, based at least in part on the determined intensity of the determined emotion state.

11. The method of claim 10, wherein receiving facial expression data comprises receiving facial landmark data of a facial mesh of the user.

12. The method of claim 10, wherein analyzing the facial expression data to determine an emotion state of the user further comprises analyzing the facial expression data to determine the intensity of the determined emotion state; wherein driving additional animation comprises creating an emitter for the additional animation, and generating a collection of particles to be emitted from the emitter, the collection of particles to be emitted being associated with the determined emotion state of the user.

13. The method of claim 10, further comprising receiving one or more image frames of the user, analyzing the one or more image frames to detect and track facial expressions of the user, and providing the facial expression data based at least in part on a result of the analysis of the one or more image frames.

14. The method of claim 13, further comprising driving animation of the avatar based on facial expressions of the user detected and tracked; and wherein driving additional animation comprises separately supplementing the animation of the avatar based on facial expressions of the user detected and tracked, with the emotion state based additional animation.

15. One or more non-transitory computer-readable media comprising instructions that cause a computing device, in response to execution of the instructions by the computing device, to operate an animation augmentation engine to:
 receive facial expression data of a user,
 analyze the facial expression data to determine an emotion state of the user, the emotion state being one of a plurality of emotion states including at least one of a disgusted state, a fear state, or a surprise state, and
 drive additional animation that supplements animation of an avatar based at least in part on a result of the determination of the emotion state of the user, the additional animation and the animation of the avatar being separate animations;
 wherein the computing device is to further determine an intensity of the determined emotion state, acquire a movement trajectory, and calculate velocity in the movement trajectory for a collection of particles to be emitted from an emitter based at least in part on the determined intensity of the determined emotion state.

16. The non-transitory computer-readable media of claim 15, wherein to receive facial expression data comprises to receive facial landmark data of a facial mesh of the user.

17. The non-transitory computer-readable media of claim 15, wherein to analyze the facial expression data comprises to respectively process the facial expression data with a plurality of emotion classifiers to generate a plurality of confidence values for corresponding emotion states of the emotion classifiers.

18. The non-transitory computer-readable media of claim 17, wherein the plurality of emotion classifiers comprise at least one of a disgusted state classifier, a fear state classifier, or a surprise state classifier.

19. The non-transitory computer-readable media of claim 17, wherein to drive additional animation comprises to create the emitter for the additional animation, and generate a collection of particles to be emitted from the emitter, the collection of particles to be emitted being associated with the determined emotion state of the user.

20. The non-transitory computer-readable media of claim 15, wherein the computing device is further caused to receive one or more image frames of the user, analyze the one or more image frames to detect and track facial expressions of the user, and to provide the facial expression data based at least in part on a result of the analysis of the one or more image frames.

21. The non-transitory computer-readable media of claim 20, wherein the computing device is further caused to drive an avatar animation engine to animate the avatar based on facial expressions of the user detected and tracked; and wherein to drive additional animation comprises to separately supplement the animation of the avatar based on facial expressions of the user detected and tracked, with the emotion state based additional animation.

22. The non-transitory computer-readable media of claim 21, wherein to drive animation comprises to generate primary animation messages based on facial expressions of the user detected and tracked, and send the primary animation messages to the avatar animation engine to drive the avatar animation engine to animate the avatar based on facial expressions of the user; and to drive additional animation comprises to generate supplemental animation messages based on the emotion state of the user detected, and send the supplemental animation messages to the avatar animation engine to drive the avatar animation engine to separately supplement the animation of the avatar based on facial expressions of the user, with the emotion state based additional animation.

23. The non-transitory computer-readable media of claim 15, wherein to analyze the facial expression data to determine an emotion state of the user further comprises to analyze the facial expression data to determine a sub-state of the determined emotion state of the user; wherein to drive additional animation that separately supplements animation of the avatar comprises to drive additional animation that separately supplements animation of the avatar, based at least in part on a result of the determination of the emotion state of the user and a result of the determination of the sub-state of the determined emotion state of the user.

24. The non-transitory computer-readable media of claim 15, wherein the plurality of emotion states includes a happy state, and the happy state includes a romantic sub-state; and wherein on determination of the user being in the happy-romantic state, wherein to drive additional animation that separately supplements animation of the avatar comprises to drive additional animation of a shower of hearts to separately supplement animation of the avatar, based at least in part on the determined happy-romantic state.

* * * * *